(12) United States Patent
Kuo et al.

(10) Patent No.: US 12,006,062 B2
(45) Date of Patent: Jun. 11, 2024

(54) METHOD AND SYSTEM FOR REDUCING AIR-TO-GROUND DATA TRAFFIC COMMUNICATED FROM AN AIRCRAFT

(71) Applicant: The Boeing Company, Chicago, IL (US)

(72) Inventors: Harrison Kuo, Oakland, CA (US); Liessman E. Sturlaugson, St. Louis, MO (US)

(73) Assignee: The Boeing Company, Arlington, VA (US)

(*) Notice: Subject to any disclaimer, the term of this patent is extended or adjusted under 35 U.S.C. 154(b) by 391 days.

(21) Appl. No.: 16/874,836

(22) Filed: May 15, 2020

(65) Prior Publication Data
US 2021/0354848 A1 Nov. 18, 2021

(51) Int. Cl.
*B64D 45/00* (2006.01)
*G06N 20/00* (2019.01)

(52) U.S. Cl.
CPC ............. *B64D 45/00* (2013.01); *G06N 20/00* (2019.01); *B64D 2045/0085* (2013.01)

(58) Field of Classification Search
None
See application file for complete search history.

(56) References Cited

U.S. PATENT DOCUMENTS

| | | | |
|---|---|---|---|
| 8,600,917 B1 | 12/2013 | Schimert et al. | |
| 8,914,149 B2* | 12/2014 | Safa-Bakhsh | G07C 5/006 700/245 |
| 11,017,678 B2* | 5/2021 | Sidiropoulos | G08G 5/0013 |
| 2003/0032426 A1* | 2/2003 | Gilbert | H04B 7/18508 455/430 |
| 2012/0191273 A1* | 7/2012 | Jacobs | B64D 45/0059 701/3 |
| 2014/0025771 A1* | 1/2014 | Tanaka | H04L 67/54 709/213 |
| 2015/0324501 A1* | 11/2015 | Desell | G01C 23/00 703/2 |

(Continued)

OTHER PUBLICATIONS

Hallac, D., Vare, S., Boyd, S., Leskovec, J. Toeplitz Inverse Covariance-Based Clustering of Multivariate Time Series Data. arXiv:1706.03161v2 [cs.LG], May 15, 2018.

*Primary Examiner* — Hunter B Lonsberry
*Assistant Examiner* — Paysun Wu
(74) *Attorney, Agent, or Firm* — McDonnell Boehnen Hulbert & Berghoff LLP

(57) ABSTRACT

A method includes receiving, by an equipment monitoring system (EMS), first training data and second training data from a plurality of sensors of an article over a first operating interval and over a second operating interval of the article, respectively, appending buffer data to the first training data, and the second training data to the buffer data to provide extended training data, and clustering the extended training data into a plurality of data clusters associated with operational states of the article. Subsequent to clustering, the EMS receives operational data associated with the plurality of sensors of the article over a third operating interval. The EMS determines a particular data cluster of the plurality of data clusters to which the operational data belongs, and communicates data indicative of an operational state of the article associated with the particular data cluster to a control system.

20 Claims, 12 Drawing Sheets

(56) References Cited

U.S. PATENT DOCUMENTS

2019/0147670 A1   5/2019  Chopra et al.
2021/0287154 A1*  9/2021  Nishino ............... G06Q 10/067
2021/0383706 A1* 12/2021  Gibbons, II ......... G08G 5/0021

* cited by examiner

630 — STORING, TO A MEMORY OF THE EMS, DATA CLUSTER DEFINITIONS THAT SPECIFY THE PLURALITY OF DATA CLUSTERS

635 — CLUSTERING THE EXTENDED TRAINING DATA FURTHER COMPRISES:
CLUSTERING, VIA A MULTIVARIATE WINDOW-BASED CLUSTERING ALGORITHM, THE EXTENDED TRAINING DATA INTO THE PLURALITY OF DATA CLUSTERS ASSOCIATED WITH THE PLURALITY OF OPERATIONAL STATES OF THE ARTICLE

640 — CLUSTERING, VIA THE MULTIVARIATE WINDOW-BASED CLUSTERING ALGORITHM, THE EXTENDED TRAINING DATA FURTHER COMPRISES:
CLUSTERING, VIA A TOEPLITZ INVERSE COVARIANCE-BASED CLUSTERING ALGORITHM, THE EXTENDED TRAINING DATA INTO THE PLURALITY OF DATA CLUSTERS ASSOCIATED WITH THE PLURALITY OF OPERATIONAL STATES OF THE ARTICLE

645 — THE TOEPLITZ INVERSE COVARIANCE-BASED CLUSTERING ALGORITHM SPECIFIES A WINDOW SIZE ASSOCIATED WITH AN AMOUNT OF TIME.
APPENDING THE FIRST BUFFER DATA TO THE FIRST TRAINING DATA FURTHER COMPRISES:
APPENDING FIRST BUFFER DATA HAVING A SIZE EQUAL TO THE WINDOW SIZE TO THE FIRST TRAINING DATA

THE PLURALITY OF OPERATIONAL STATES INCLUDE VALID OPERATIONAL STATES AND INVALID OPERATIONAL STATES, THE METHOD FURTHER COMPRISES:
SPECIFYING VALUES OF THE FIRST BUFFER DATA SO THAT THE FIRST BUFFER DATA CLUSTERS INTO AN INVALID OPERATIONAL STATE

655

COMMUNICATING DATA INDICATIVE OF THE PLURALITY OF OPERATIONAL STATES TO THE CONTROL SYSTEM, COMPRISES:
COMMUNICATING, BY THE EMS, DATA INDICATIVE OF VALID OPERATIONAL STATES TO THE CONTROL SYSTEM

660

CLUSTERING THE EXTENDED TRAINING DATA INTO THE PLURALITY OF DATA CLUSTERS ASSOCIATED WITH THE PLURALITY OF OPERATIONAL STATES OF THE ARTICLE, COMPRISES:
RESPONSIVE TO DETERMINING THAT A THRESHOLD AMOUNT OF EXTENDED TRAINING DATA EXISTS, CLUSTERING, BY THE EMS, THE EXTENDED TRAINING DATA INTO THE PLURALITY OF DATA CLUSTERS ASSOCIATED WITH THE PLURALITY OF OPERATIONAL STATES OF THE ARTICLE

665

RESPONSIVE TO THE ARTICLE ENTERING INTO A PARTICULAR SEQUENCE OF OPERATIONAL STATES, SCHEDULING, BY THE CONTROL SYSTEM, MAINTENANCE TO BE PERFORMED ON THE ARTICLE

*Fig. 6C*

670 — RESPONSIVE TO THE ARTICLE ENTERING INTO A PARTICULAR SEQUENCE OF OPERATIONAL STATES, COMMUNICATING, BY THE EMS, THE OPERATIONAL DATA ASSOCIATED WITH THE PLURALITY OF SENSORS OF THE ARTICLE TO THE CONTROL SYSTEM

675 — RECEIVING THE FIRST TRAINING DATA AND THE SECOND TRAINING DATA FROM THE ARTICLE COMPRISES: RECEIVING, BY THE EMS, THE FIRST TRAINING DATA FROM A PLURALITY OF SENSORS OF AN AIRCRAFT OVER A FIRST FLYING TIME OF THE AIRCRAFT, AND THE SECOND TRAINING DATA FROM THE PLURALITY OF SENSORS OF THE AIRCRAFT OVER A SECOND FLYING TIME OF THE AIRCRAFT

680 — CLUSTERING THE EXTENDED TRAINING DATA INTO THE PLURALITY OF DATA CLUSTERS ASSOCIATED WITH THE PLURALITY OF OPERATIONAL STATES OF THE ARTICLE COMPRISES:
CLUSTERING, BY THE EMS, THE EXTENDED TRAINING DATA INTO A PLURALITY OF DATA CLUSTERS ASSOCIATED WITH THE PLURALITY OF OPERATIONAL STATES OF THE AIRCRAFT, WHEREIN THE PLURALITY OF OPERATIONAL STATES INDICATE MODES OF OPERATION OF A COMPONENT OR SUBSYSTEM OF THE AIRCRAFT

*Fig. 6D*

METHOD AND SYSTEM FOR REDUCING AIR-TO-GROUND DATA TRAFFIC COMMUNICATED FROM AN AIRCRAFT

BACKGROUND

Field

This application generally relates to equipment monitoring systems. In particular, this application describes a method and system for reducing air-to-ground data traffic communicated from an aircraft.

Description of Related Art

Many commercial aircraft communicate health-related information to ground control systems that can facilitate identification, by the ground control system, of serviceability and performance related issues of the aircraft. The health-related information can include sensor data associated with various sensors arranged on the aircraft that measure, for example, pressure, temperature, position, altitude, speed, operating state, etc. associated with the aircraft and/or subsystems of the aircraft.

As aircraft have evolved, the number of aircraft subsystems generating sensor data, and therefore health-related information, has increased. In some cases, however, the radio frequency (RF) communication systems used in these aircraft may not be capable of transmitting all the health-related information due to limited RF bandwidth.

SUMMARY

In a first aspect, a method implemented by a computing system includes receiving, by an equipment monitoring system (EMS), first training data from a plurality of sensors of an article over a first operating interval of the article, and second training data from the plurality of sensors of the article over a second operating interval of the article. The EMS appends first buffer data to the first training data and the second training data to the first buffer data to provide extended training data. The EMS clusters the extended training data into a plurality of data clusters associated with operational states of the article. Subsequent to clustering, the EMS receives operational data associated with the plurality of sensors of the article over a third operating interval. The EMS determines a particular data cluster of the plurality of data clusters to which the operational data belongs, and communicates data indicative of an operational state of the article associated with the particular data cluster to a control system.

In a second aspect, a system includes a memory and a processor. The memory stores instruction code. The processor is in communication with the memory. The instruction code is executable by the processor to cause the processor to perform operations that include receiving first training data from a plurality of sensors of an article over a first operating interval of the article, and second training data from the plurality of sensors of the article over a second operating interval of the article. The operations include appending first buffer data to the first training data, and the second training data to the first buffer data to provide extended training data, and clustering the extended training data into a plurality of data clusters associated with operational states of the article. Subsequent to clustering, operational data associated with the plurality of sensors of the article is received over a third operating interval. A particular data cluster of the plurality of data clusters to which the operational data belongs is determined. Data indicative of an operational state of the article associated with the particular data cluster is communicated to a control system.

In a third aspect, a non-transitory computer-readable medium having stored thereon instruction code is provided. When the instruction code is executed by a processor, the processor performs operations that include receiving first training data from a plurality of sensors of an article over a first operating interval of the article, and second training data from the plurality of sensors of the article over a second operating interval of the article. The operations include appending first buffer data to the first training data, and the second training data to the first buffer data to provide extended training data, and clustering the extended training data into a plurality of data clusters associated with operational states of the article. Subsequent to clustering, operational data associated with the plurality of sensors of the article is received over a third operating interval. A particular data cluster of the plurality of data clusters to which the operational data belongs is determined. Data indicative of an operational state of the article associated with the particular data cluster is communicated to a control system.

BRIEF DESCRIPTION OF THE DRAWINGS

The accompanying drawings are included to provide a further understanding of the claims, are incorporated in, and constitute a part of this specification. The detailed description and illustrated examples described serve to explain the principles defined by the claims.

FIG. 6B illustrates further methods that can be performed by an equipment monitoring system, in accordance with an example.

FIG. 6C illustrates further methods that can be performed by an equipment monitoring system, in accordance with an example.

FIG. 6D illustrates further methods that can be performed by an equipment monitoring system, in accordance with an example.

DETAILED DESCRIPTION

Figure 1:
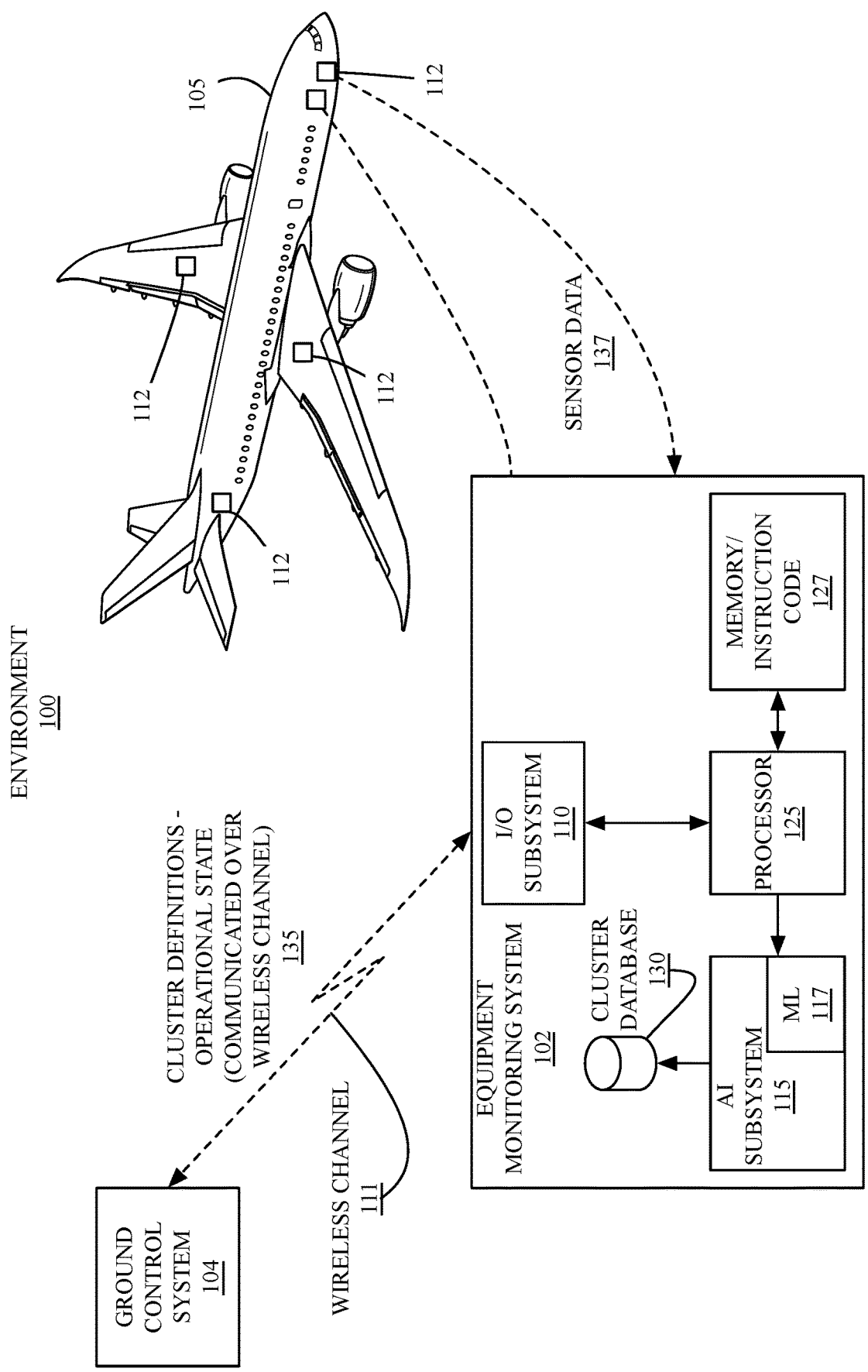
FIG. 1 illustrates an environment that includes various systems/devices that facilitate reducing air-to-ground data traffic communicated from an aircraft, in accordance with an example.

Implementations of this disclosure provide technological improvements that are particular to computer technology, such as those related to reducing memory requirements required to ascertain the operational state of an aircraft. In this regard, the examples disclosed herein utilize a clustering algorithm that processes vast amounts of sensor data to determine a sequence of operational states that characterize operations of the aircraft. Information associated with these operational states can be stored and/or communicated to a ground control system. The amount of memory required to store the sequence of operational states is far less than the amount of memory that would otherwise be required to store the vast amounts of sensor data.

Implementations of this disclosure further address problems particular to computer networks. In particular, by reducing the amount of information needed to characterize the operational state of the aircraft, less data is required to be communicated between systems. Thus, network traffic can be reduced.

Various examples of systems, devices, and/or methods are described herein. Words such as "example" and "exemplary" that may be used herein are understood to mean "serving as an example, instance, or illustration." Any embodiment, implementation, and/or feature described herein as being an "example" or "exemplary" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially," or "about" that may be used herein, are meant that the recited characteristic, parameter, or value need not be achieved exactly, but that deviations or variations, including, for example, tolerances, measurement error, measurement accuracy limitations and other factors known to those skilled in the art, may occur in amounts that do not preclude the effect the characteristic was intended to provide.

I. Introduction

As noted above, the RF systems used in certain aircraft may not be capable of transmitting all the health-related information associated with the aircraft due to the limited RF bandwidth of these RF systems. The health-related information in these cases may, therefore, only include the most critical sensor data, which may provide limited insight into the operation of the aircraft. Other sensor data may be stored locally on the aircraft and retrieved at a later time, such as when the aircraft is undergoing maintenance.

One way to provide additional real-time insight into the health of the aircraft without necessitating additional RF bandwidth involves communicating operational state information associated with the aircraft and/or subsystems of the aircraft rather than the actual sensor data. For example, the sensor data of the aircraft can be processed by a multivariate time-series data clustering algorithm that clusters the sensor data received according to operational states of the aircraft and/or operational states of the subsystems of the aircraft. The multivariate time-series data clustering algorithm is configured with a window (e.g., an amount of time). Sensor data received during each window/time interval is clustered according to operational states of the aircraft and/or operational states of the subsystems of the aircraft.

Multivariate time-series data clustering algorithms can require a significant amount of sensor data before any meaningful insights associated with the sensor data can be determined. In the context of aircraft, however, the amount of sensor data generated by some subsystems of the aircraft during a particular flight can be insufficient. For example, a sensor that provides information related to the landing gear may only generate a few samples of data during a particular flight (e.g., during deployment and retraction).

Described below is an aircraft equipment monitoring system that alleviates this issue. Generally, the aircraft equipment monitoring system trains a multivariate time-series data clustering algorithm with training data that spans multiple flights. The multivariate time-series data clustering algorithm can then reliably cluster sensor data according to operational states of the aircraft and/or operational states of subsystems of the aircraft.

The training data includes sensor data of the aircraft and/or subsystems of the aircraft that were acquired over multiple flights of the aircraft. Buffer data is interposed between the sensor data acquired during each flight to facilitate clustering the sensor data acquired over multiple independent flights in a consistent manner. The addition of the buffer between the sensor data reduces the risk of cluster misidentification by adding definite boundaries that separate each time series of sensor data.

FIG. 1 illustrates an example of an environment 100 that includes various systems/devices that facilitate reducing air-to-ground data traffic communicated from an aircraft 105. Example systems/devices of the environment 100 include an aircraft 105, an equipment monitoring system (EMS) 102, and a ground control system 104. An example of the EMS 102 can be arranged within the aircraft 105 and can be configured to communicate with the ground control system 104 via a wireless channel 111. Data indicative of an operational state of an aircraft 105 (e.g. an article) associated with the particular data cluster is communicated to a ground control system 104.

An example of the aircraft 105 can include various subsystems and these subsystems can be communicatively coupled to one or more sensors 112 that facilitate monitoring the operational state of the aircraft 105 and/or the operational states of the subsystems of the aircraft 105. Within examples, these subsystems can include and/or control the propulsion system, flaps, ailerons, rudders, landing gear, communication systems, etc. The sensors 112 can be configured to obtain data related to, for example, pressure, temperature, position, speed, operating state, etc. that can be associated with these systems.

The EMS 102 can include components such as a memory 127 and a processor 125. An example of the EMS 102 can include other subsystems such as an input/output (I/O) subsystem 110 and an artificial intelligence (AI) subsystem 115. Details related to the various subsystems of the EMS 102 and the operations performed by these subsystems are described in further detail below.

The processor 125 is in communication with the memory 127. The processor 125 is configured to execute instruction code stored in the memory 127. The instruction code facilitates performing, by the EMS 102, various operations that are described below. In this regard, the instruction code can cause the processor 125 to control and coordinate various activities performed by the different subsystems of the EMS 102. The processor 125 can correspond to a stand-alone computer system such as an Intel®, AMD®, or PowerPC® based computer system or a different computer system and can include application-specific computer systems. The computer system can include an operating system, such as Linux, Unix®, or a different operating system.

An example of the I/O subsystem 110 can include one or more input, output, or input/output interfaces and is configured to facilitate communications with entities outside of the EMS 102. In this regard, an example of the I/O subsystem 110 can be configured to communicate with various subsystems of the aircraft 105 and to receive sensor data 137 from sensors 112 associated with these subsystems. An example of the I/O subsystem 110 can further include a wireless interface that facilitates wirelessly communicating information to the ground control system 104. For example, the I/O subsystem 110 can be configured to communicate with an aircraft communications addressing and reporting system (ACARS) of the ground control system 104.

An example of the AI subsystem 115 can correspond to hardware, software, or a combination thereof that is specifically configured to implement or assist in the implementation of various supervised and unsupervised machine learning models. Within examples, these can involve implementation of a Holt-Winters algorithm, exponential time smoothing (ETS) algorithm, an artificial neural network (ANN), a recurrent neural network (RNN), a seasonal autoregressive moving average (SARIMA) algorithm, a network of long short-term memories (LSTM), a gated recurring unit (GRU) algorithm. Examples of the AI Subsystem 115 can implement other machine learning (ML) logic 117 and/or AI algorithms.

An example of the AI subsystem 115 can implement a multivariate time-series data clustering algorithm. In this regard, as described in more detail below, the AI subsystem 115 can be configured to receive multivariate time-series data that includes sensor data 137 received from the sensors 112 of the aircraft 105 and to cluster the multivariate time-series data according to operational states of the aircraft 105 and/or operational states of the subsystems of the aircraft 105.

It is contemplated that any of the subsystems referenced herein can correspond to a stand-alone computer system such as an Intel®, AMD®, or PowerPC® based computer system or a different computer system and can include application-specific computer systems. The computer systems can include an operating system, such as Microsoft Windows®, Linux, Unix®, or another operating system. It is also contemplated that operations performed on the various subsystems can be combined into a fewer or greater number of subsystems to facilitate speed scaling, cost reductions, etc.

Figure 2:
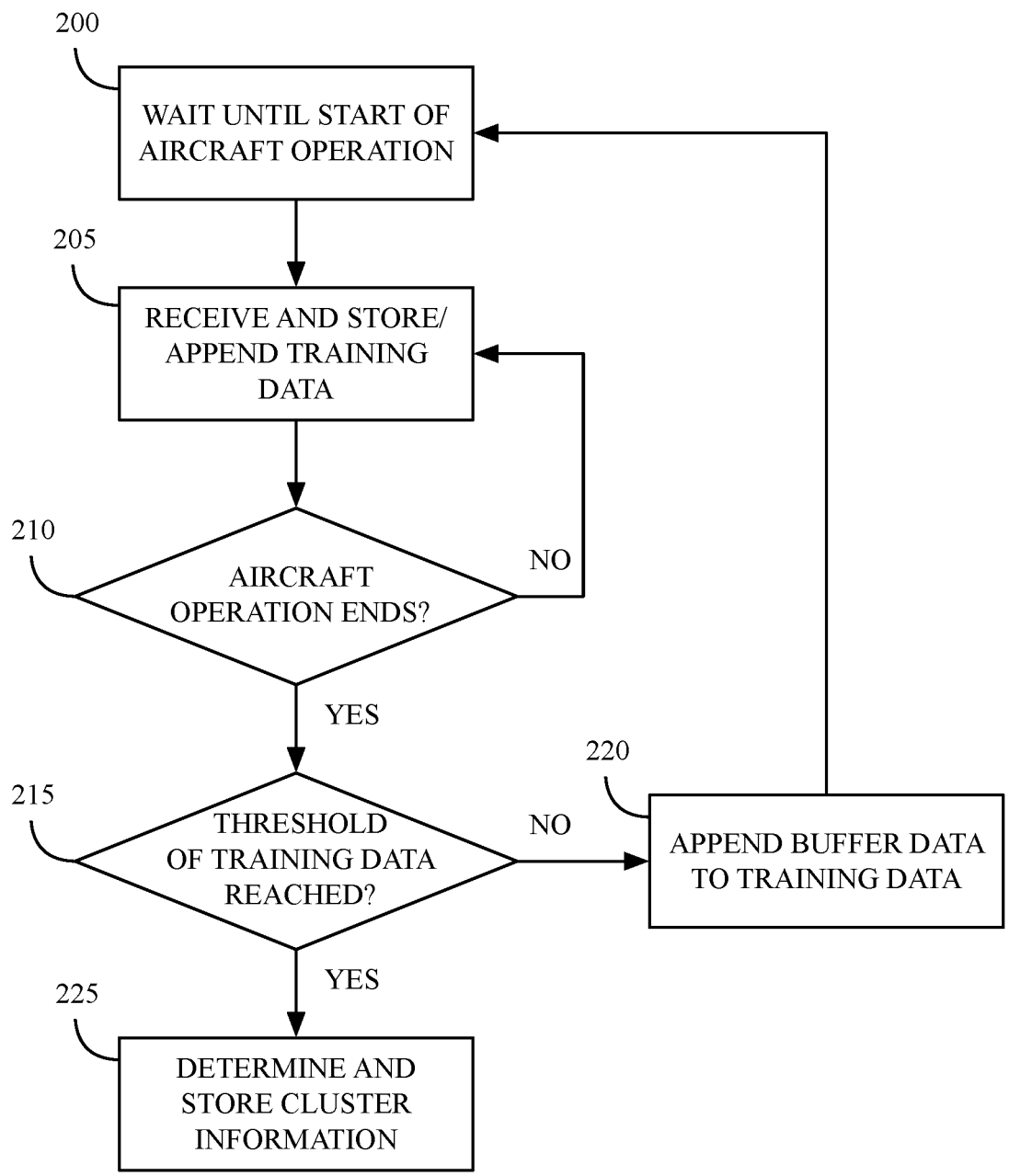
FIG. 2 illustrates operations performed by an equipment monitoring system (EMS) of the aircraft that facilitate training a multivariate time-series data clustering algorithm to identify different operational states of the aircraft and/or operational states of subsystems of the aircraft, in accordance with an example.

FIG. 2 illustrates examples of operations performed by the EMS 102 that facilitate training the multivariate time-series data clustering algorithm to identify different operational states of the aircraft 105 and/or the operational states of the subsystems of the aircraft 105. In this regard, one or more of the operations can be implemented via instruction code, stored in the memory 127 of the EMS 102, configured to cause the processor 125 of the EMS 102 to perform the operations illustrated in the figures and discussed herein. The operations illustrated in FIG. 2 are best understood with reference to the diagrams illustrated in FIGS. 3A-3D.

Operations at block 200 can involve waiting until a start time of aircraft operations, such as waiting until aircraft systems have been powered on, the aircraft 105 has begun takeoff procedures, the aircraft 105 is flying, etc. Other indications can be used to determine whether aircraft operations have started.

Operations at block 205 can involve receiving first training data 315A and storing the first training data 315A during a first operating interval 305A. The first training data 315A can be received by the EMS 102 and stored in, for example, the memory 127. An example of the first operating interval 305A can be associated with the interval during which the aircraft 105 took off from a departure runway and subsequently landed at a destination runway. Another example of the first operating interval 305A can be associated with the interval during which the aircraft 105 left a departure gate and arrived at a destination gate.

Figure 3A:
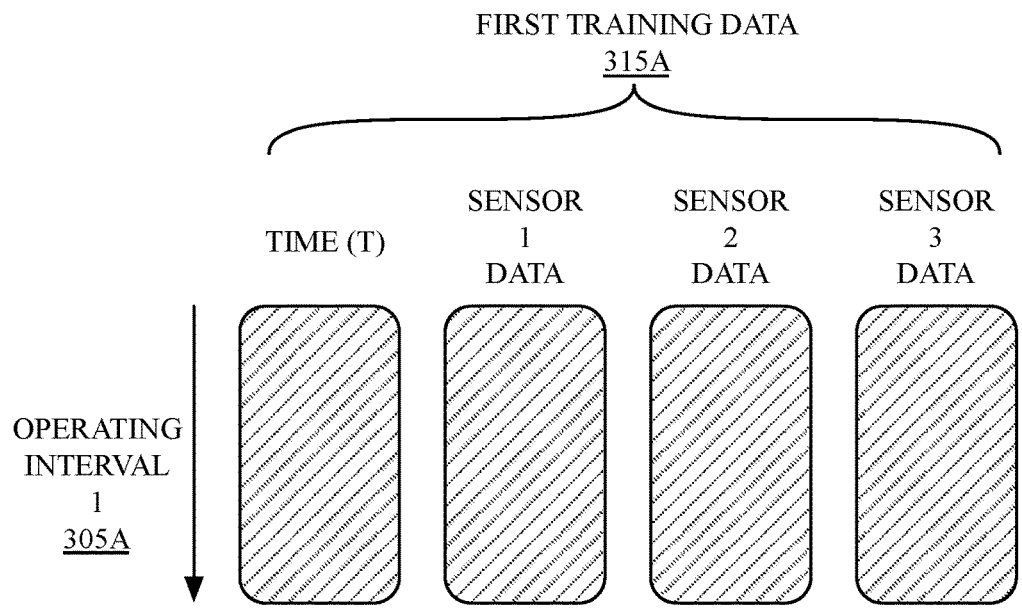
FIG. 3A illustrates first training data acquired during a first operating interval of the aircraft that can be used to train the multivariate time-series data clustering algorithm, in accordance with an example.

Referring to FIG. 3A, an example of the first training data 315A can include sensor data 137 associated with different subsystems/components of the aircraft 105 (e.g., sensor 1 data, sensor 2 data, sensor 3 data, etc.). The sensor data 137 generated by a given sensor 112 may specify a particular parameter associated with a particular component such as pressure, temperature, position, altitude, speed, operating state, etc. associated with that component. The sensor data 137 can be associated with a timestamp indicative of a time at which the sensor data 137 was received. In some examples, the timestamp can have a resolution of minutes, seconds, milliseconds, etc. The sensor data 137 can be continuously received during the first operating interval 305A.

If at block 210, aircraft equipment operations have not ended, then the operations from block 200 can repeat. For example, the ending operation can correspond to the aircraft 105 being powered off, the aircraft 105 having finished landing procedures, etc. Other indications can be used to determine whether aircraft operations have ended.

If at block 210, the aircraft operations have ended (e.g. aircraft operation ends), and at block 215, the amount of first training data 315A obtained by the EMS 102 is has not reached a threshold extent of data (e.g. the threshold of training data is not reached), then at block 220, first buffer data 310A can be appended to the first training data 315A that is stored in the memory 127 to provide extended training data 317, and the operation returns to block 200.

However, if at block 215 the amount of extended training data 317 stored in the memory reaches the threshold extent of data (e.g. the threshold of training data is reached), cluster definitions associated with the stored extended training data 317 can be determined at block 225. For example, as described in additional detail below, the extended training data 317 can be processed via a multivariate time-series data clustering algorithm.

Figure 3B:
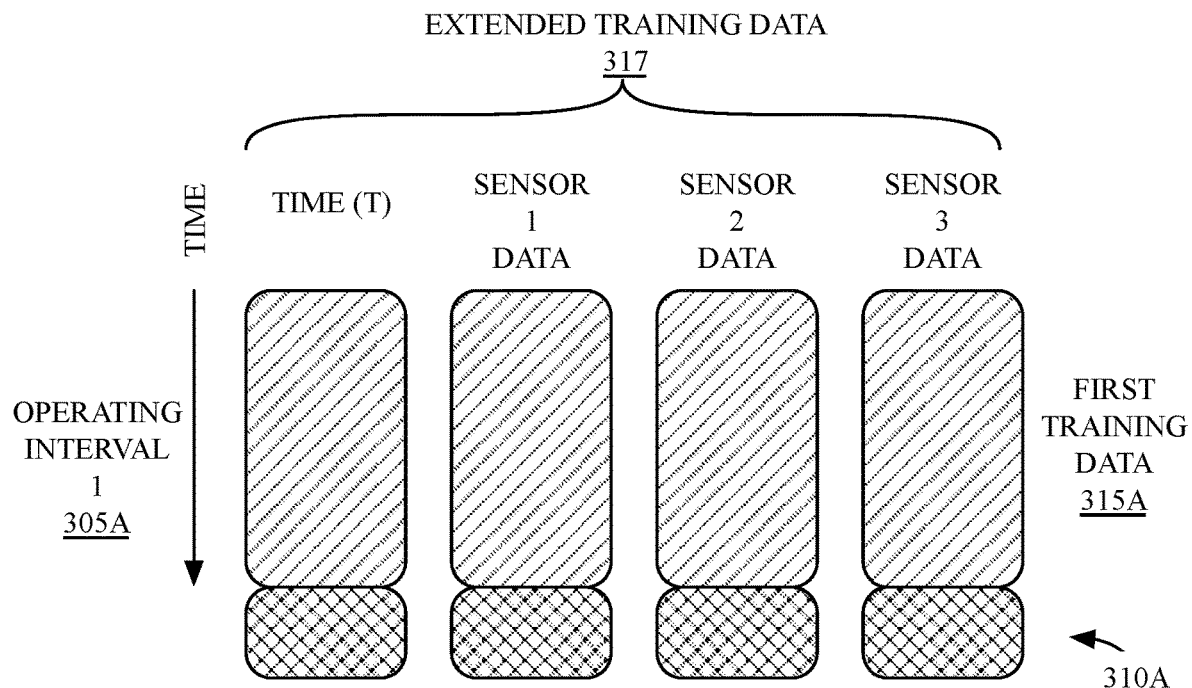
FIG. 3B illustrates first buffer data that can be appended to the training data, in accordance with an example.

FIG. 3B illustrates an example of the first buffer data that can be appended to the first training data 315A to provide extended training data 317. As noted above, a particular multivariate time-series data clustering algorithm can specify a window of time over which sensor data 137 is clustered. In this case, as an example, the amount of first buffer data 310A appended to the first training data 315A can equal the window size. For example, if the window size corresponds to one minute of time, and the interval at which first training data 315A is received/sample is one second, first buffer data 310A that specifies a sequence of 60 values can be appended to the first training data 315A. In one example, the values of the first buffer data 310A appended to a particular sequence of sensor data 137 (e.g., sensor 1 data) within the first training data 315A can be set to a value that would not be expected to be present in the corresponding sensor data 137. For example, if valid values for sensor 1 data fall within the range 99 and 999, the values of the first buffer data 310A appended to the sensor 1 data can be set to a value such as 0 or 10000, which are not expected to be present in the sensor 1 data. Alternatively, the value of the first buffer data 310A appended to a particular sequence of sensor data 137 (e.g., sensor 1 data) can be set so that when clustered with the values of the first buffer data 310A values appended to the other sequences of sensor data 137 (e.g., sensor 2 data, sensor 3 data) the buffer values cluster into an invalid operational state. That is, the buffer values cluster into an operational state that never occurs in reality. As described below, this can facilitate the identification and removal of cluster definitions associated with the first buffer data 310A.

Figure 3C:
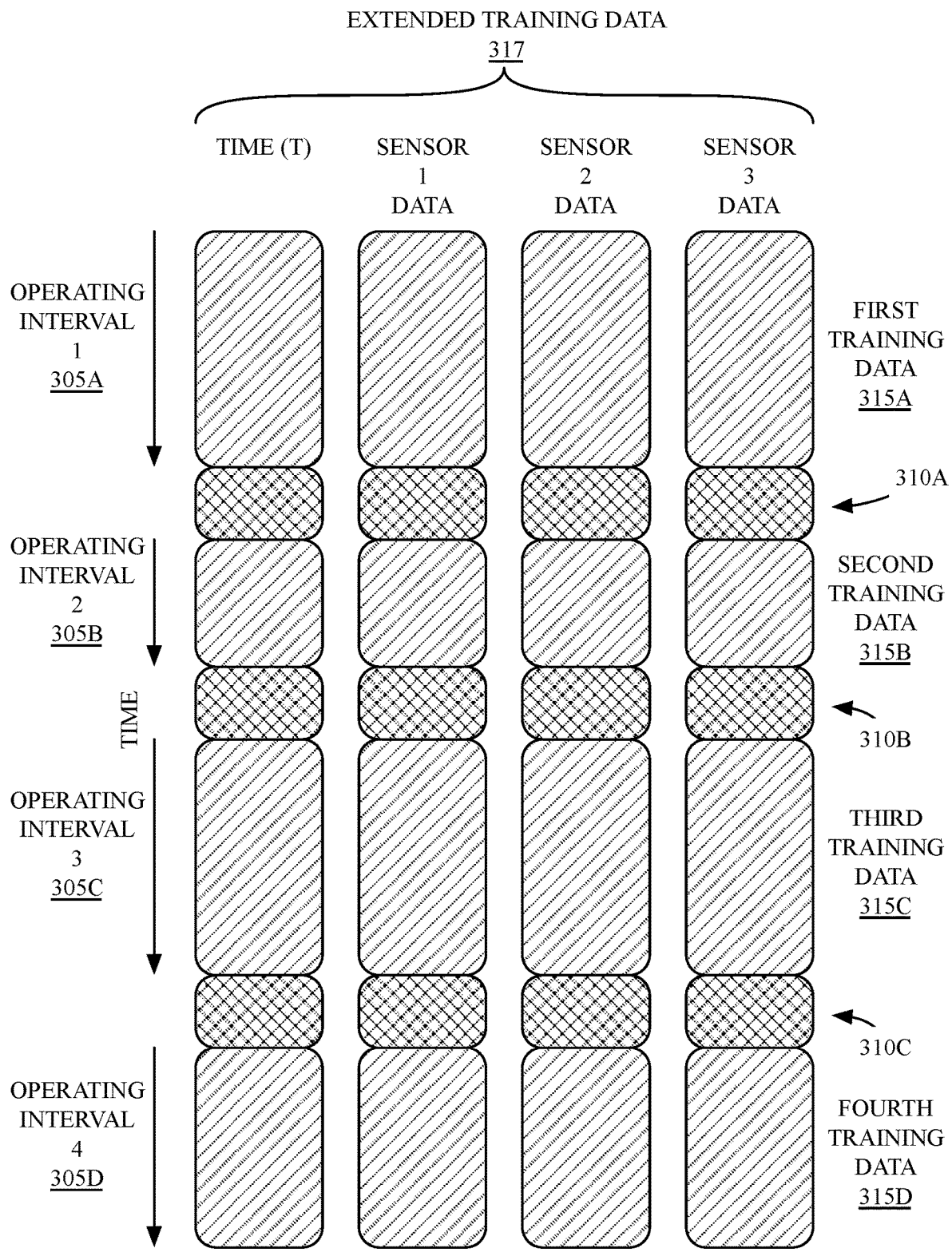
FIG. 3C illustrates appending additional training data to the existing training data, in accordance with an example.

The operations above can repeat until the amount of extended training data 317 obtained by the EMS 102 and stored to the memory 127 reaches the threshold. For example, as illustrated in FIG. 3C, after a second operating interval 305B (e.g., a second flight), second training data 315B associated with the second operating interval 305B (i.e., sensor data acquired during the second flight) can be appended to the first buffer data 310A to increase the size of the extended training data 317. Second buffer data 310B can be appended to the second training data 315B at the end of the second operating interval 305B. After a third operating interval 305C (e.g., a third flight), third training data 315C associated with the third operating interval 305C can be appended to the second buffer data 310B to further increase the size of the extended training data 317. After a fourth operating interval 305D (e.g., a fourth flight), fourth training data 315D associated with the fourth operating interval 305D can be appended to the third buffer data 310C. Thus, the amount of extended training data 317 grows with each operation (e.g., after every flight) of the aircraft 105. This process can repeat until the amount of extended training data 317 stored in the memory reaches a threshold amount.

As described with reference to FIG. 2, at block 225, the extended training data 317 can be processed via a multivariate time-series data clustering algorithm. One example of a multivariate time-series data clustering algorithm that can be utilized to determine the cluster definitions can correspond to a Toeplitz inverse covariance-based clustering (TICC) algorithm (See D. Hallac, S. Vare, S. Boyd, and J. Leskovec, Toeplitz Inverse Covariance-Based Clustering of Multivariate Time Series Data, Proceedings of the 23rd ACM SIGKDD International Conference on Knowledge Discovery and Data Mining. 215-223). Generally, the TICC algorithm can segment a time series of data into a sequence of states, or "clusters." Each cluster is characterized by a correlation network, or Markov random field (MRF), defined over a short window of size w, which can correspond to the window/time interval described above. The MRF governs the time-invariant partial correlation structure of any window inside a segment belonging to that cluster.

Figure 3D:
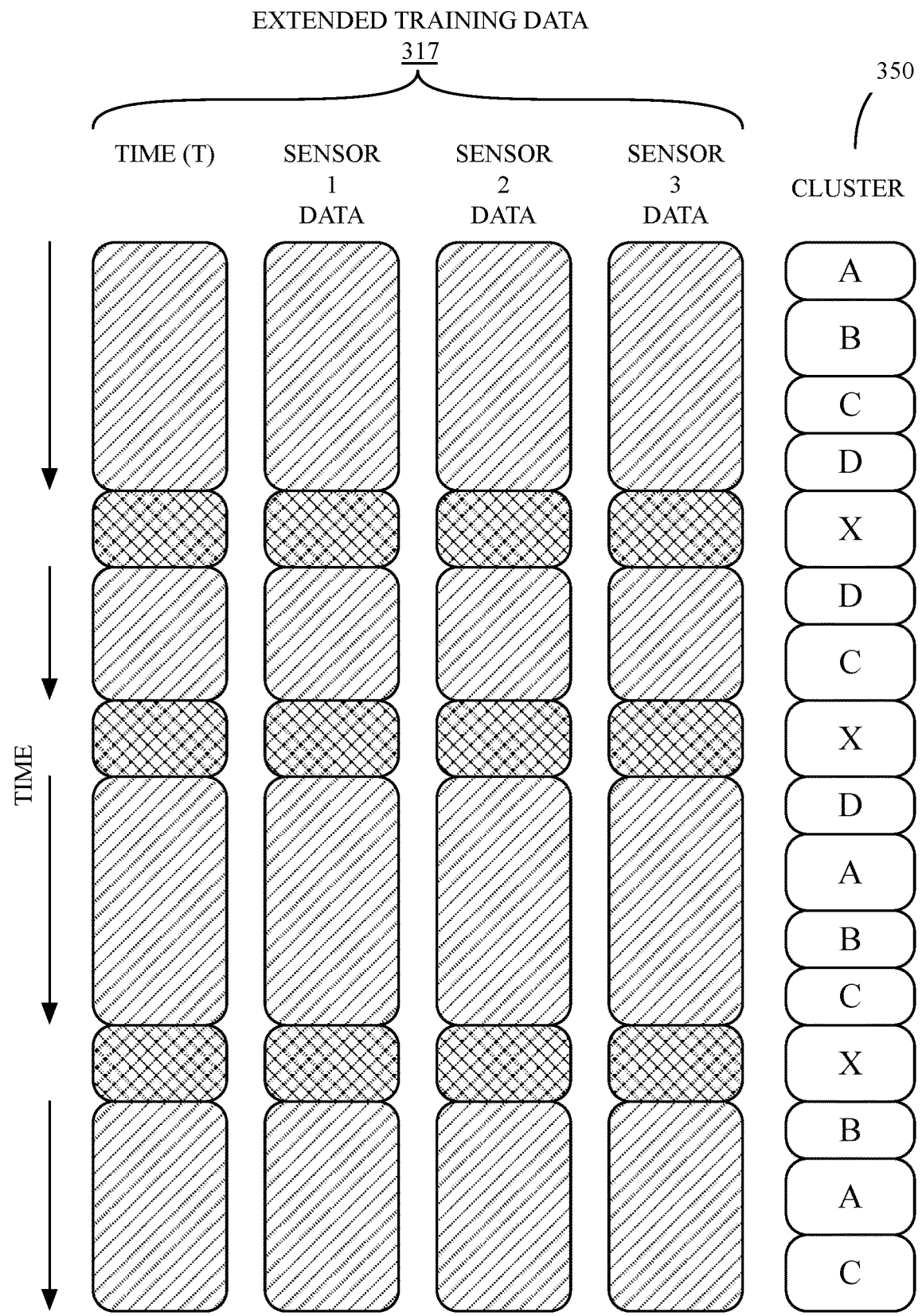
FIG. 3D illustrates cluster definitions that can be discovered within the training data by the multivariate time-series data clustering algorithm, in accordance with an example

FIG. 3D illustrates examples of cluster definitions 350 that can be discovered within the extended training data 317 by the multivariate time-series data clustering algorithm. Each cluster definition 350 (e.g., cluster A, B, C, D, and X) is associated with particular values of sensor data 137 (e.g., sensor 1 data, sensor 2 data, sensor 3 data, etc.) within the extended training data 317 that correlate with each other over a window of time. Certain cluster definitions 350 (e.g., clusters A, B, C, and D) can correlate with valid operational states of the aircraft 105 and/or operational states of the subsystems of the aircraft 105. For example, valid operational states of the aircraft 105 and/or operational states of the subsystems of the aircraft 105 can include or be associated with the aircraft 105 banking right or left, a propulsion system being on or off, the landing gear being deployed or retracted, the flaps being in a particular position, the environmental control system remaining steady or modulating or surging. Other cluster definitions 350 (e.g., cluster X) may not have any meaningful correlation to an operational state of the aircraft 105 and/or an operational state of subsystems of the aircraft 105. As noted above, values specified for the buffer data (310A, 310B, 310C) are selected to cluster to an invalid operational state when processed by the multivariate time-series data clustering algorithm.

Cluster information that specifies the cluster definitions associated with valid operational states can be stored to the memory 127. Cluster information that can be stored can include, for example, the network topology and corresponding inverse covariance matrices of the MRF in the case of the TICC algorithm, the cluster center in the case of windowed k-means clustering, the cluster centroid in the case of windowed k-medoids clustering. In some examples, after the cluster definitions have been identified, an expert (e.g., aircraft operations expert) can review cluster definitions and determine the operational state of the aircraft 105 and/or the operational state of the subsystem of the aircraft 105 associated with the cluster definition. For example, the expert can review the sensor data 137 associated with the cluster definitions and the time interval over which the sensor data 137 was acquired to ascertain the operational state of the aircraft 105 such as whether the aircraft 105 was banking right or left, whether a propulsion system was on or off, whether the landing gear was deployed or retracted, whether the flaps were in a particular position, whether the environmental control system was remaining steady or modulating or surging. After ascertaining the operational state of the aircraft 105, the expert can associate the cluster definitions with the operational state. In an example, the association between the operational state and the cluster definitions can be specified in the cluster database 130 of the EMS 102. In another example, the association between the operational state and the cluster definitions can be specified in a database of the ground control system 104

Figure 4:
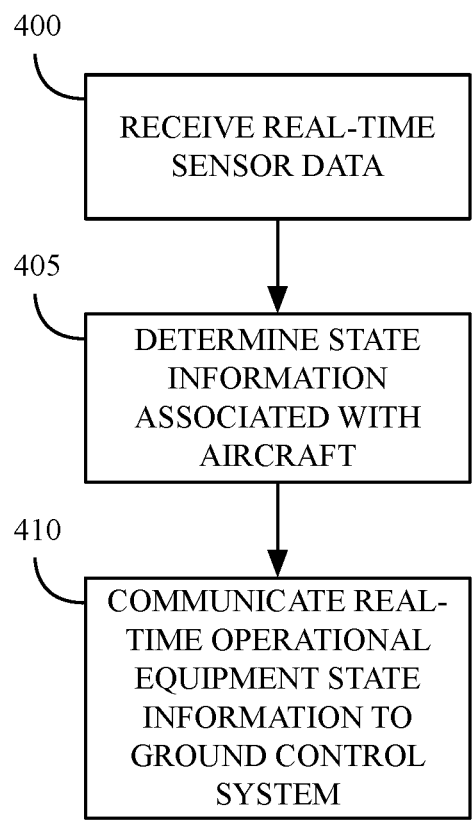
FIG. 4 illustrates operations performed by the EMS that facilitate communicating the operational state of the aircraft during normal operations, in accordance with an example.

FIG. 4 illustrates examples of operations performed by the EMS 102 that facilitate communicating the operational state of the aircraft 105 during normal operations of the aircraft. These operations are performed after the training operations of FIG. 2 have been performed. In this regard, one or more of the operations can be implemented via instruction code, stored in the memory 127 of the EMS 102, configured to cause the processor 125 of the EMS 102 to perform the operations illustrated in the figures and discussed herein.

Operations at block 400 can involve receiving sensor data 137 from the aircraft in real-time. The sensor data 137 can specify, for example, the pressure, temperature, position, speed, operating state, etc., associated with the aircraft 105 and/or subsystems of the aircraft 105.

Operations at block 405 can involve processing the sensor data 137 through the clustering algorithm described above to determine cluster definitions, and therefore, operational state information associated with the sensor data 137.

Operations at block 410 can involve communicating real-time operational equipment state information to a ground control system 104. That is, cluster definitions and/or the operational state 135 of the aircraft 105 (e.g. the article) can be communicated to a ground control system 104. For example, cluster definitions such as cluster A, B, C, or D can be communicated from the EMS 102 to the ground control system 104. In this case, the ground control system 104 may include a database that stores records that associate the cluster definitions with the operational states of the aircraft 105 and/or operational states of the subsystems of the aircraft 105. In another example, the EMS 102 records that associate the cluster definitions with the operational states of the aircraft 105 and/or operational states of the subsystems of the aircraft 105 can be stored in the cluster database 130 of the EMS 102. Communicating the cluster definitions and/or the operational state to the ground control system 104 rather than the sensor data 137 can greatly reduce the amount of information communicated between the aircraft 105 and the ground control system 104. Thus, additional insight into the real-time health of the aircraft can be ascertained without necessitating additional RF bandwidth.

Figure 5:
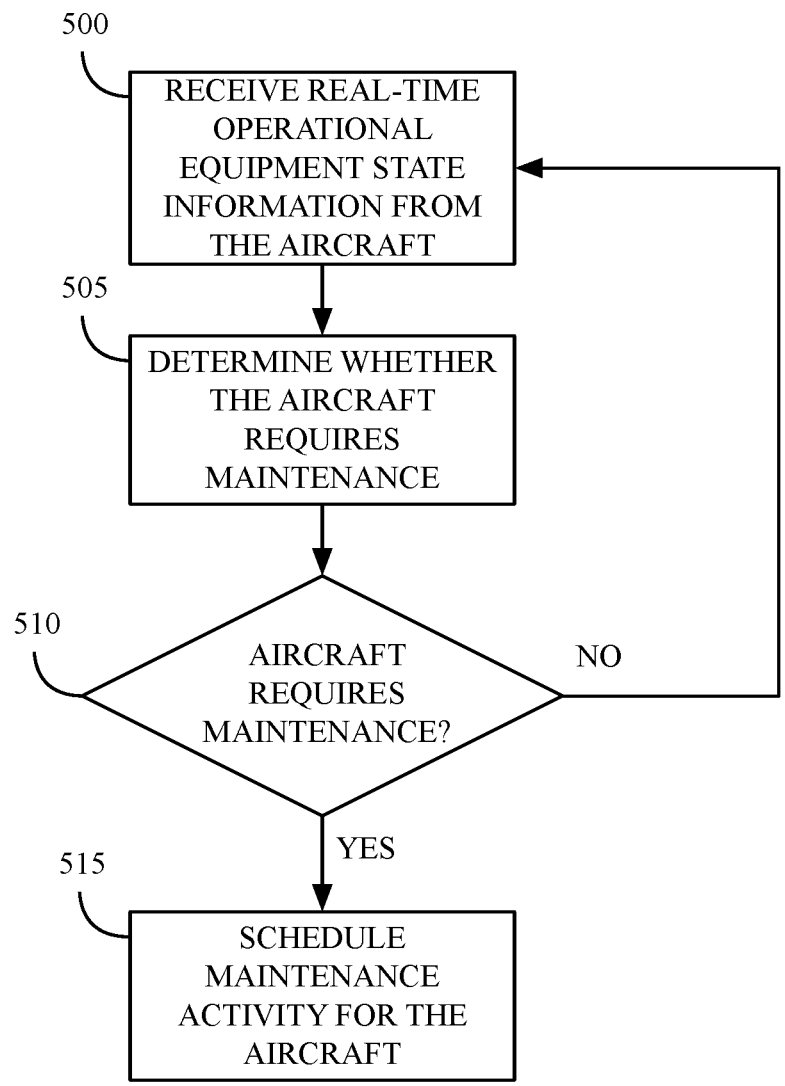
FIG. 5 illustrates operations performed by a ground control system of the environment after receiving the operational state information from the aircraft, in accordance with an example.
Figure 6A:
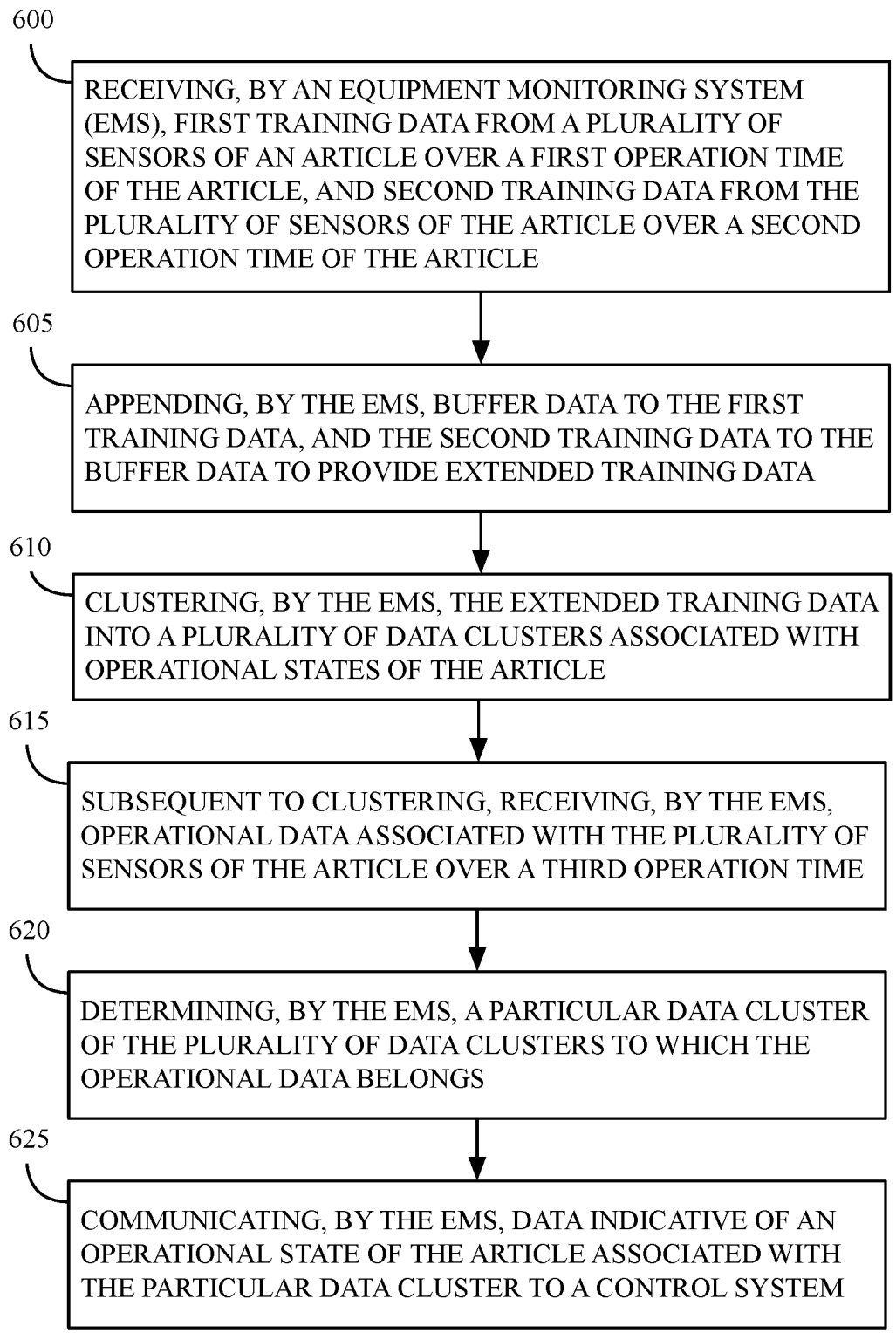
FIG. 6A illustrates a method that can be performed by an equipment monitoring system, in accordance with an example.

FIG. 5 illustrates examples of operations performed by the ground control system 104 after receiving the operational state information from the aircraft 105. These operations can be performed after the operations of FIG. 4 have been performed. Operations at block 500 can involve receiving, in real-time, operational equipment state information from the aircraft 105. For example, the operational state information can specify whether the aircraft 105 is banking right or left, whether a propulsion system is on or off, whether the landing gear is deployed or retracted, whether the flaps are in a particular position, whether the environmental control system was remaining steady or modulating or surging, etc.

Operations at block 505 can involve determining whether the aircraft requires maintenance based on the sequence of operational states received from the aircraft. For example, if the aircraft 105 transitions through a particular sequence of operational states, a determination can be made by the ground control system 104 that a particular type of maintenance should be performed on the aircraft 105. In some examples, the ground control system 104 can implement a multivariate time-series data clustering algorithm that is trained to associate different sequences of aircraft operations with different types of maintenance activities.

If at block 510, the ground control system 104 determines that a particular type of maintenance is required, then at block 515, the ground control system 104 can schedule a maintenance activity for the aircraft 105. For example, the ground control system 104 can communicate with a maintenance scheduling system to schedule maintenance for the aircraft 105. In some examples, the aircraft 105 can communicate pertinent sensor data 137 to the ground control system 104 when a determination is made that maintenance of the aircraft 105 is required. The additional sensor data 137 can be used by, for example, a maintenance crew to determine the root cause of an issue. In one example, communication of the additional sensor data 137 can occur responsive to an instruction from the ground control system 104 to do so. In another example, the aircraft 105 can determine an issue based on a particular sequence of operational states and can automatically communicate the additional sensor data 137 upon making this determination. Otherwise, if at block 510 the ground control system 104 determines that a particular type of maintenance is not required, then flow returns to block 500.

FIGS. 6A-6D illustrate a method that can be performed by one or more of the examples described above. Block 600 can involve receiving, by an equipment monitoring system (EMS) 102, first training data 315A from a plurality of sensors 112 of an article 105 over a first operating interval 305A of the article 105, and second training data 315B from the plurality of sensors 112 of the article 105 over a second operating interval 305B of the article 105.

Block 605 can involve appending, by the EMS 102, first buffer data 310A to the first training data 315A, and the second training data 315B to the first buffer data 310A to provide extended training data 317.

Block 610 can involve clustering, by the EMS 102, the extended training data 317 into a plurality of data clusters associated with operational states of the article 105.

Block 615 can involve subsequent to clustering, receiving, by the EMS 102, operational data associated with the plurality of sensors 112 of the article 105 over a third operating interval 305C.

Block 620 can involve determining, by the EMS 102, a particular data cluster of the plurality of data clusters to which the operational data belongs.

Block 625 can involve communicating, by the EMS 102, data indicative of an operational state of the article 105 associated with the particular data cluster to a control system.

As illustrated in block 630, some examples can involve storing, to a memory 127 of the EMS 102, data cluster definitions that specify the plurality of data clusters.

As illustrated in block 635, in some examples, clustering the extended training data 317 can involve clustering, via a multivariate window-based clustering algorithm, the extended training data 317 into the plurality of data clusters associated with the operational states of the article 105.

As illustrated in block 640, in some examples, clustering, via the multivariate window-based clustering algorithm, the extended training data 317 can involve clustering, via a Toeplitz Inverse Covariance-Based Clustering algorithm, the extended training data 317 into the plurality of data clusters associated with the operational states of the article 105.

As illustrated in block 645, in some examples, the Toeplitz Inverse Covariance-Based Clustering algorithm specifies a window size associated with an amount of time. In these cases, appending the first buffer data 310A to the first training data 315A can involve appending first buffer data 310A having a size equal to the window size to the first training data 315A.

As illustrated in block 650, in some examples, the plurality of operational states include valid operational states and invalid operational states. These examples can involve specifying values of the first buffer data 310A so that the first buffer data 310A clusters into an invalid operational state. As illustrated in block 655, in these examples, communicating data indicative of the plurality of operational states to the control system can involve communicating, by the EMS 102, data indicative of valid operational states to the control system.

As illustrates in block 660, in some examples, clustering the extended training data 317 into the plurality of data clusters associated with operational states of the article 105 can involve, responsive to determining that a threshold amount of extended training data 317 exists, clustering, by the EMS 102, the extended training data 317 into the plurality of data clusters associated with the plurality of operational states of the article 105.

As illustrates in block 665, some examples can involve, responsive to the article 105 entering into a particular sequence of operational states, scheduling, by the control system, maintenance to be performed on the article 105.

As illustrates in block 670, some examples can involve, responsive to the article 105 entering into a particular sequence of operational states, communicating, by the EMS 102, the operational data associated with the plurality of sensors 112 of the article 105 to the control system.

As illustrates in block 675, in some examples, receiving the first training data 315A and the second training data 315B from the article 105 can involve receiving, by the EMS 102, the first training data 315A from a plurality of sensors 112 of an aircraft 105 over a first flying time of the aircraft 105, and the second training data 315B from the plurality of sensors 112 of the aircraft 105 over a second flying time of the aircraft 105.

As illustrates in block 680, in some examples, clustering the extended training data 317 into the plurality of data clusters associated with the operational states of the article 105 can involve clustering, by the EMS 102, the extended training data 317 into a plurality of data clusters associated with operational states of the aircraft 105, wherein the operational states indicate modes of operation of a component or subsystem of the aircraft 105.

Figure 7:
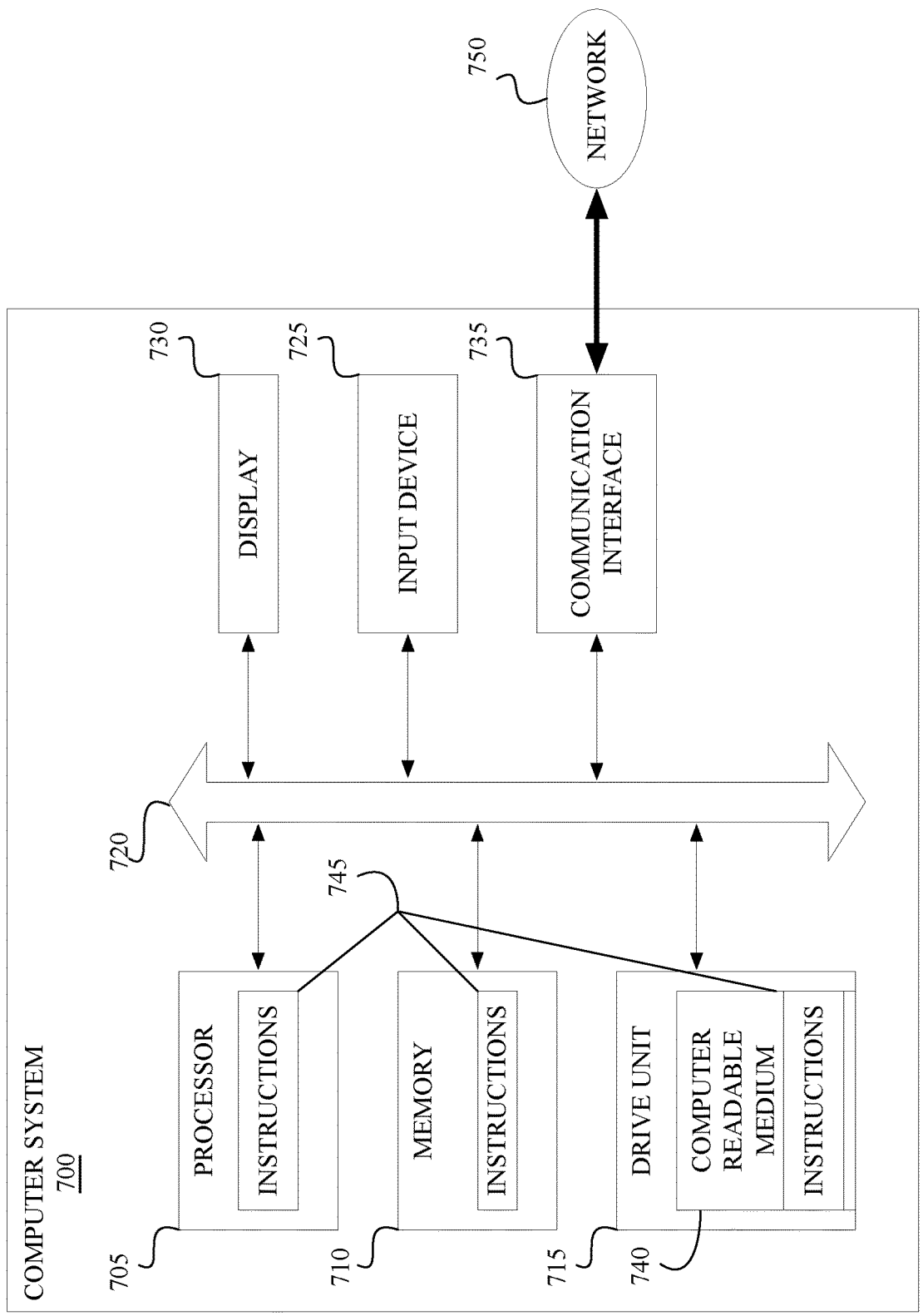
FIG. 7 illustrates a computer system that can form part of or implement any of the systems or devices of the environment, in accordance with an example.

FIG. 7 illustrates an example of a computer system 700 that can form part of or implement any of the systems and/or devices described above. The computer system 700 can include a set of instructions 745 that the processor 705 can execute to cause the computer system 700 to perform any of the operations described above. An example of the computer system 700 can operate as a stand-alone device or can be connected, e.g., using a network, to other computer systems or peripheral devices.

In a networked example, the computer system 700 can operate in the capacity of a server or as a client computer in a server-client network environment, or as a peer computer system in a peer-to-peer (or distributed) environment. The computer system 700 can also be implemented as or incorporated into various devices, such as a personal computer or a mobile device, capable of executing instructions 745 (sequential or otherwise), causing a device to perform one or more actions. Further, each of the systems described can include a collection of subsystems that individually or jointly execute a set, or multiple sets, of instructions to perform one or more computer operations.

The computer system 700 can include one or more memory devices 710 communicatively coupled to a bus 720 for communicating information. In addition, code operable to cause the computer system to perform operations described above can be stored in the memory 710. The memory 710 can be random-access memory, read-only memory, programmable memory, hard disk drive, or any other type of memory or storage device.

The computer system 700 can include a display 730, such as a liquid crystal display (LCD), a cathode ray tube (CRT), or any other display suitable for conveying information. The display 730 can act as an interface for the user to see processing results produced by processor 705.

Additionally, the computer system 700 can include an input device 725, such as a keyboard or mouse or touch-screen, configured to allow a user to interact with components of system 700.

The computer system 700 can also include a disk or optical drive unit 715. The drive unit 715 can include a computer-readable medium 740 in which the instructions 745 can be stored. The instructions 745 can reside completely, or at least partially, within the memory 710 and/or within the processor 705 during execution by the computer system 700. The memory 710 and the processor 705 also can include computer-readable media as discussed above.

The computer system 700 can include a communication interface 735 to support communications via a network 750. The network 750 can include wired networks, wireless networks, or combinations thereof. The communication interface 735 can enable communications via any number of wireless broadband communication standards, such as the Institute of Electrical and Electronics Engineering (IEEE) standards 802.11, 802.12, 802.16 (WiMAX), 802.20, cellular telephone standards, or other communication standards.

Accordingly, methods and systems described herein can be realized in hardware, software, or a combination of hardware and software. The methods and systems can be realized in a centralized fashion in at least one computer system or in a distributed fashion where different elements are spread across interconnected computer systems. Any kind of computer system or other apparatus adapted for carrying out the methods described herein can be employed.

The methods and systems described herein can also be embedded in a computer program product, which includes all the features enabling the implementation of the operations described herein and which, when loaded in a computer system, can carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

The invention claimed is:

1. A method implemented by a computing system, the method comprising:
receiving, by an equipment monitoring system (EMS) of an aircraft, first training data from a plurality of sensors of the aircraft over a first operating interval of the aircraft during a first flight, and second training data from the plurality of sensors of the aircraft over a second operating interval of the aircraft during a second flight;

appending, by the EMS, first buffer data between the first training data and the second training data to provide extended training data;

determining, by the EMS, whether the extended training data reaches a threshold extent of data;

appending, by the EMS, second buffer data to the extended training data when the extended training data is less than the threshold extent of data and repeat training data collection from the plurality of sensors of the aircraft over a third operating interval;

based on determining that the extended training data reaches the threshold extent of data, clustering, by the EMS executing a multivariate window-based clustering algorithm to train the multivariate window-based clustering algorithm for the aircraft with training data that spans multiple flights of the aircraft, the extended training data into a plurality of data clusters associated with a plurality of operational states of the aircraft, such that values of sensor data from the plurality of sensors in the first training data and the second training data received during each operating interval are clustered according to being associated with a same operational state of the aircraft, wherein the plurality of operational states include valid operational states and invalid operational states and specifying values of the first buffer data so that the first buffer data clusters into an invalid operational state;

subsequent to clustering, receiving, by the EMS, operational data output from the plurality of sensors of the aircraft over a fourth operating interval;

determining, by the EMS executing the trained multivariate window-based clustering algorithm, a particular data cluster of the plurality of data clusters to which the operational data output from the plurality of sensors belongs; and communicating, by the EMS of the aircraft via a wireless channel, data indicative of valid operational states of the aircraft associated with the particular data cluster to a control system.

2. The method according to claim 1, further comprising: storing, to the EMS, data cluster definitions that specify the plurality of data clusters.

3. The method according to claim 1, wherein clustering, via the multivariate window-based clustering algorithm, the extended training data further comprises:

clustering, via a Toeplitz Inverse Covariance-Based Clustering algorithm, the extended training data into the plurality of data clusters associated with the plurality of operational states of the aircraft.

4. The method according to claim 3, wherein the Toeplitz Inverse Covariance-Based Clustering algorithm specifies a window size associated with an amount of time, wherein appending the first buffer data to the first training data further comprises:

appending first buffer data having a size equal to the window size to the first training data.

5. The method according to claim 4, wherein clustering the extended training data into the plurality of data clusters associated with the plurality of operational states of the aircraft, comprises:

responsive to determining that a threshold amount of extended training data exists, clustering, by the EMS, the extended training data into the plurality of data clusters associated with the plurality of operational states of the aircraft.

6. The method according to claim 1, further comprising: responsive to the aircraft entering into a particular sequence of operational states, scheduling, by the control system, maintenance to be performed on the aircraft.

7. The method according to claim 1, further comprising: responsive to the aircraft entering into a particular sequence of operational states, communicating, by the EMS, the operational data associated with the plurality of sensors of the aircraft to the control system.

8. The method according to claim 1, wherein clustering the extended training data into the plurality of data clusters associated with the plurality of operational states of the aircraft comprises:

clustering, by the EMS, the extended training data into a plurality of data clusters associated with the plurality of operational states of the aircraft, wherein the plurality of operational states indicate modes of operation of a component or subsystem of the aircraft.

9. A system comprising:

a memory that stores instruction code; and a processor in communication with the memory, wherein the instruction code is executable by the processor to perform operations comprising:

receiving first training data from a plurality of sensors of an aircraft over a first operating interval of the aircraft during a first flight, and second training data from the plurality of sensors of the aircraft over a second operating interval of the aircraft during a second flight;

appending first buffer data between the first training data and the second training data to provide extended training data;

determining whether the extended training data reaches a threshold extent of data;

appending second buffer data to the extended training data when the extended training data is less than the threshold extent of data and repeat training data collection from the plurality of sensors of the aircraft over a third operating interval;

based on determining that the extended training data reaches the threshold extent of data, clustering via execution of a multivariate window-based clustering algorithm to train the multivariate window-based clustering algorithm for the aircraft with training data that spans multiple flights for the aircraft, the extended training data into a plurality of data clusters associated with a plurality of operational states of the aircraft, such that values of sensor data from the plurality of sensors in the first training data and the second training data received during each operating interval are clustered according to being associated with a same operational state of the aircraft, wherein the plurality of operational states include valid operational states and invalid operational states and specifying values of the first buffer data so that the first buffer data clusters into an invalid operational state;

subsequent to clustering, receiving operational data output from the plurality of sensors of the aircraft over a fourth operating interval;

determining via execution of the trained multivariate window-based clustering algorithm, a particular data cluster of the plurality of data clusters to which the operational data output from the plurality of sensors belongs; and communicating via a wireless channel, data indicative of valid operational states of the aircraft associated with the particular data cluster to a control system.

10. The system according to claim 9, wherein the instruction code is executable by the processor to perform further operations comprising:

storing, to the memory, data cluster definitions that specify the plurality of data clusters.

11. The system according to claim 9, wherein the multivariate window-based clustering algorithm corresponds to a Toeplitz Inverse Covariance-Based Clustering algorithm that specifies a window size and the plurality of operational states include valid operational states and invalid operational state, wherein in appending the first buffer data to the first training data, the instruction code is executable by the processor to perform operations comprising:

appending first buffer data having a size equal to the window size to the first training data.

12. The system according to claim 11, wherein in clustering the extended training data into the plurality of data clusters associated with the plurality of operational states of the aircraft, the instruction code is executable by the processor to perform operations comprising:

responsive to determining that a threshold amount of extended training data exists, clustering the extended training data into the plurality of data clusters associated with the plurality of operational states of the aircraft.

13. The system according to claim 9, wherein the instruction code is executable by the processor to perform further operations comprising:

responsive to the aircraft entering into a particular sequence of operational states, scheduling, by the control system, maintenance to be performed on the aircraft.

14. The system according to claim 9, wherein the instruction code is executable by the processor to perform further operations comprising:

responsive to the aircraft entering into a particular sequence of operational states, communicating the operational data associated with the plurality of sensors of the aircraft to the control system.

15. The system according to claim 9, wherein clustering the extended training data into the plurality of data clusters associated with the plurality of operational states of the aircraft, the instruction code is executable by the processor to perform operations comprising:

clustering the extended training data into a plurality of data clusters associated with the plurality of operational states of the aircraft, wherein the plurality of operational states indicate modes of operation of a component or subsystem of the aircraft.

16. A non-transitory computer-readable medium having stored thereon instruction code, wherein the instruction code is executable by a processor of a computer to perform operations comprising:

receiving first training data from a plurality of sensors of an aircraft over a first operating interval of the aircraft during a first flight, and second training data from the plurality of sensors of the aircraft over a second operating interval of the aircraft during a second flight;

appending first buffer data between the first training data and the second training data to provide extended training data;

determining whether the extended training data reaches a threshold extent of data;

appending second buffer data to the extended training data when the extended training data is less than the threshold extent of data and repeat training data collection from the plurality of sensors of the aircraft over a third operating interval;

based on determining that the extended training data reaches the threshold extent of data, clustering via execution of a multivariate window-based clustering algorithm to train the multivariate window-based clustering algorithm for the aircraft with training data that spans multiple flights for the aircraft, the extended training data into a plurality of data clusters associated with a plurality of operational states of the aircraft, such that values of sensor data from the plurality of sensors in the first training data and the second training data received during each operating interval are clustered according to being associated with a same operational state of the aircraft, wherein the plurality of operational states include valid operational states and invalid operational states and specifying values of the first buffer data so that the first buffer data clusters into an invalid operational state;

subsequent to clustering, receiving operational data output from the plurality of sensors of the aircraft over a fourth operating interval;

determining via execution of the trained multivariate window-based clustering algorithm, a particular data cluster of the plurality of data clusters to which the operational data output from the plurality of sensors belongs; and communicating via a wireless channel, data indicative of valid operational states of the aircraft associated with the particular data cluster to a control system.

17. The non-transitory computer-readable medium of claim 16, wherein the instruction code is further executable by the processor to perform operations comprising:

storing data cluster definitions that specify the plurality of data clusters.

18. The non-transitory computer-readable medium of claim 16, wherein the instruction code is further executable by the processor to perform operations comprising:

clustering, via a Toeplitz Inverse Covariance-Based Clustering algorithm, the extended training data into the plurality of data clusters associated with the plurality of operational states of the aircraft.

19. The non-transitory computer-readable medium of claim 18, wherein the Toeplitz Inverse Covariance-Based Clustering algorithm specifies a window size associated with an amount of time, wherein appending the first buffer data to the first training data further comprises:

appending first buffer data having a size equal to the window size to the first training data.

20. The non-transitory computer-readable medium of claim 16, wherein clustering the extended training data into the plurality of data clusters associated with the plurality of operational states of the aircraft comprises:

clustering the extended training data into a plurality of data clusters associated with the plurality of operational states of the aircraft, wherein the plurality of operational states indicate modes of operation of a component or subsystem of the aircraft.

* * * * *